US011217375B2

(12) United States Patent
Tsuchihashi et al.

(10) Patent No.: US 11,217,375 B2
(45) Date of Patent: Jan. 4, 2022

(54) ACTUATOR

(71) Applicant: NIDEC SANKYO CORPORATION, Nagano (JP)

(72) Inventors: Masao Tsuchihashi, Nagano (JP); Tadashi Takeda, Nagano (JP); Hiroshi Kitahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 131 days.

(21) Appl. No.: 16/627,342

(22) PCT Filed: Jun. 11, 2018

(86) PCT No.: PCT/JP2018/022171
§ 371 (c)(1),
(2) Date: Dec. 30, 2019

(87) PCT Pub. No.: WO2019/003875
PCT Pub. Date: Jan. 3, 2019

(65) Prior Publication Data
US 2020/0161038 A1 May 21, 2020

(30) Foreign Application Priority Data
Jun. 30, 2017 (JP) .............................. JP2017-128675

(51) Int. Cl.
*H01F 7/08* (2006.01)
*H01F 7/06* (2006.01)
(Continued)

(52) U.S. Cl.
CPC ............. *H01F 7/081* (2013.01); *H01F 7/064* (2013.01); *H01F 7/126* (2013.01); *H01F 7/128* (2013.01); *H01F 2007/086* (2013.01)

(58) Field of Classification Search
CPC .... H01F 2007/086; H01F 7/064; H01F 7/081; H01F 7/126; H01F 7/128; H01F 7/1646; H02K 33/16; B06B 1/045
See application file for complete search history.

(56) References Cited

U.S. PATENT DOCUMENTS 10,063,129 B2 * 8/2018 Mao ..................... H02K 33/16
2013/0201559 A1 * 8/2013 Minamisawa ........... G02B 7/08
359/557

(Continued)

FOREIGN PATENT DOCUMENTS

CN 106471719 3/2017
JP 2010104718 5/2010
(Continued)

OTHER PUBLICATIONS

"International Search Report (Form PCT/ISA/210)" of PCT/JP2018/022171, dated Jul. 3, 2018, with English translation thereof, pp. 1-2.
(Continued)

*Primary Examiner* — Bernard Rojas
(74) *Attorney, Agent, or Firm* — JCIPRNET

(57) ABSTRACT

In the actuator, the first end plate part of the first cover member in the support body is layered on one side in the first direction of the holder and faces the first yoke of the movable body from one side in the first direction. The second end plate part of the second cover member in the support body is layered on the other side in the first direction of the holder and faces the movable body from the other side in the first direction. Thus, the first viscoelastic member interposed between the movable body and the first end plate part in the first direction properly contacts with the movable body and the first end plate part. The second viscoelastic member interposed between the movable body and the
(Continued)

second end plate part in the first direction properly contacts with the movable body and the second end plate part.

6 Claims, 7 Drawing Sheets

(51) Int. Cl.
    *H01F 7/126*     (2006.01)
    *H01F 7/128*     (2006.01)

(56) References Cited

U.S. PATENT DOCUMENTS

| | | | |
|---|---|---|---|
| 2017/0310203 A1 | 10/2017 | Takeda et al. | |
| 2019/0286238 A1* | 9/2019 | Yahata | G06F 3/044 |
| 2019/0326803 A1* | 10/2019 | Hasegawa | H02K 33/18 |

FOREIGN PATENT DOCUMENTS

| | | |
|---|---|---|
| JP | 2011102887 | 5/2011 |
| JP | 2016-127789 | 7/2016 |
| WO | 2016104349 | 6/2016 |

OTHER PUBLICATIONS

"Office Action of China Counterpart Application", dated Dec. 25, 2020, with English translation thereof, pp. 1-14.

* cited by examiner

ACTUATOR

CROSS-REFERENCE TO RELATED APPLICATION

This application is a 371 application of the international PCT application serial no. PCT/JP2018/022171, filed on Jun. 11, 2018, which claims the priority benefits of Japan application no. 2017-128675 filed on Jun. 30, 2017. The entirety of each of the abovementioned patent applications is hereby incorporated by reference herein and made a part of this specification.

TECHNICAL FIELD

The present invention relates to an actuator for generating various kinds of vibrations.

BACKGROUND ART

As a device for generating vibrations with a magnetic drive mechanism, an actuator has been proposed in which a movable body is vibrated relative to a support body in a second direction intersecting a first direction by a magnetic drive circuit having a coil and magnets which face the coil in the first direction (Patent Literature 1). In the actuator disclosed in Patent Literature 1, viscoelastic members composed of gel-based damper members are arranged between the movable body and the support body. The movable body is supported to the support body via the viscoelastic members and resonance caused when the movable body is driven is restrained. More specifically described, in the support body, a first cover member, a holder holding magnets and a second cover member are layered in the first direction, and the viscoelastic members are arranged between the first cover member and the movable body and between the second cover member and the movable body.

CITATION LIST

Patent Literature

Patent Literature 1: Japanese Unexamined Patent Publication No. 2016-127789

SUMMARY

Problems to be Solved by the Invention

When a first cover member, a holder and a second cover member are layered in the first direction as in the actuator of Patent Literature 1, however, the distance between the first cover member and the movable body in the first direction and the distance between the second cover member and the movable body in the first direction may vary. If the distance is too long, a gap may occur between the viscoelastic member and the first cover member, between the viscoelastic member and the movable body or between the viscoelastic member and the second cover member; with such gaps existing, resonance caused when the movable body is driven may not be restrained. On the other hand, if the distance is too short, the viscoelastic member may be excessively collapsed between the first cover member and the movable body or between the second cover member and the movable body; therefore, resonance caused when the movable body is driven may not be restrained.

Considering the above problems, an objective of the present invention is to provide an actuator in which viscoelastic members can properly be arranged between a support body and a movable body.

Means for Solving the Problem

To solve the above problems, an actuator to which the present invention is applied comprises a support body, a movable body, and a magnetic drive circuit provided with a coil and magnets which face the coil in the first direction for driving the movable body in the second direction crossing the first direction; the support body has a holder which holds either the coil or the magnets and a first end plate part which is layered on one side in the first direction of the holder and faces the movable body from one side in the first direction; the movable body holds the other of either the coil or the magnets; between the movable body and the support body, a first viscoelastic member is provided at a portion at which the movable body and the first end plate part face each other in the first direction.

In the present invention, the first end plate part of the support body is layered on one side in the first direction of the holder which holds the coil or the magnets and faces the movable body from one side in the first direction. Therefore, the first end plate part is positioned in the first direction on the basis of the position of the holder; therefore, the first viscoelastic member interposed in the portion at which the movable body and the first end plate part face each other in the first direction makes proper contact with the movable body and the first end plate part, and therefore, it will not be excessively collapsed. Thus, the first viscoelastic member can be properly arranged between the support body and the movable body. Therefore, resonance caused when the movable body is driven can properly be restrained.

The present invention may adopt a configuration in which the support body has a second end plate part which is layered on the other side in the first direction of the holder and faces the movable body from the other side in the first direction, and a second viscoelastic member is interposed in a portion at which the movable body and the second end plate part face each other in the first direction between the movable body and the support body. With this configuration, the second end plate part is positioned in the first direction on the basis of the position of the holder; therefore, the amount of the space between the movable body and the second end plate part in the first direction will not easily vary. Since the second viscoelastic member interposed in the portion at which the movable body and the second end plate part face each other in the first direction make proper contacts with the movable body and the second end plate part, it will not be excessively collapsed, and thus the second viscoelastic member can properly be arranged between the support body and the movable body. Therefore, resonance caused when the movable body is driven can properly be restrained.

The present invention may adopt a configuration in which the holder holds the coil and the movable body is provided with a first yoke having a first magnet as part of the magnets fixed at the portion thereof facing one side in the first direction of the coil and a second yoke, which faces the other side in the first direction of the coil; the first viscoelastic member is interposed in the portion at which the first yoke and the first end plate part face each other in the first direction; the second viscoelastic member is interposed in the portion at which the second yoke and the second end plate part face each other in the first direction.

The present invention may adopt a configuration in which a second magnet as part of the magnets is fixed at the portion of the second yoke which faces on the other side in the first direction of the coil. According to this configuration, the first magnet and the second magnet are used; therefore, thrust to the movable body can be increased. Also, the movable body is configured symmetric or essentially symmetric in the first direction; therefore, the center of driving of the magnetic drive circuit and the center of gravity of the movable body agree or essentially agree with each other in the first direction. Accordingly, when driven, the movable body will not easily tilt.

The present invention may adopt a configuration in which a first cover member having a first end plate part and a second cover member having a second end plate part are provided; the holder and the movable body are at least partially covered by either the first cover member or the second cover member in the first direction and the second direction.

The present invention may adopt a configuration in which at least either the first cover member or the second cover member has side plate parts which overlap the other of the either cover member in the second direction. According to this configuration, even when the first cover member and the second cover member are positioned in the first direction on the basis of the position of the holder, the movable body, etc. can be covered by the side plate parts in the second direction.

Effect of the Invention

In the present invention, the first end plate part of the support body is layered on one side in the first direction of the holder which holds the coil or magnets and faces the movable body from one side in the first direction. For this reason, the first end plate part is positioned in the first direction on the basis of the position of the holder; therefore, the amount of the space between the movable body and the first end plate part in the first direction does not easily vary. Therefore, the first viscoelastic member interposed in the portion at which the movable body and the first end plate face each other in the first direction makes proper contacts with both the support body and the first end plate part, and therefore will not be excessively collapsed. Thus, the first viscoelastic member can be properly arranged between the support body and the movable body. Therefore, resonance caused when the movable body is driven can properly be restrained.

DESCRIPTION OF EMBODIMENTS

Figure 1:
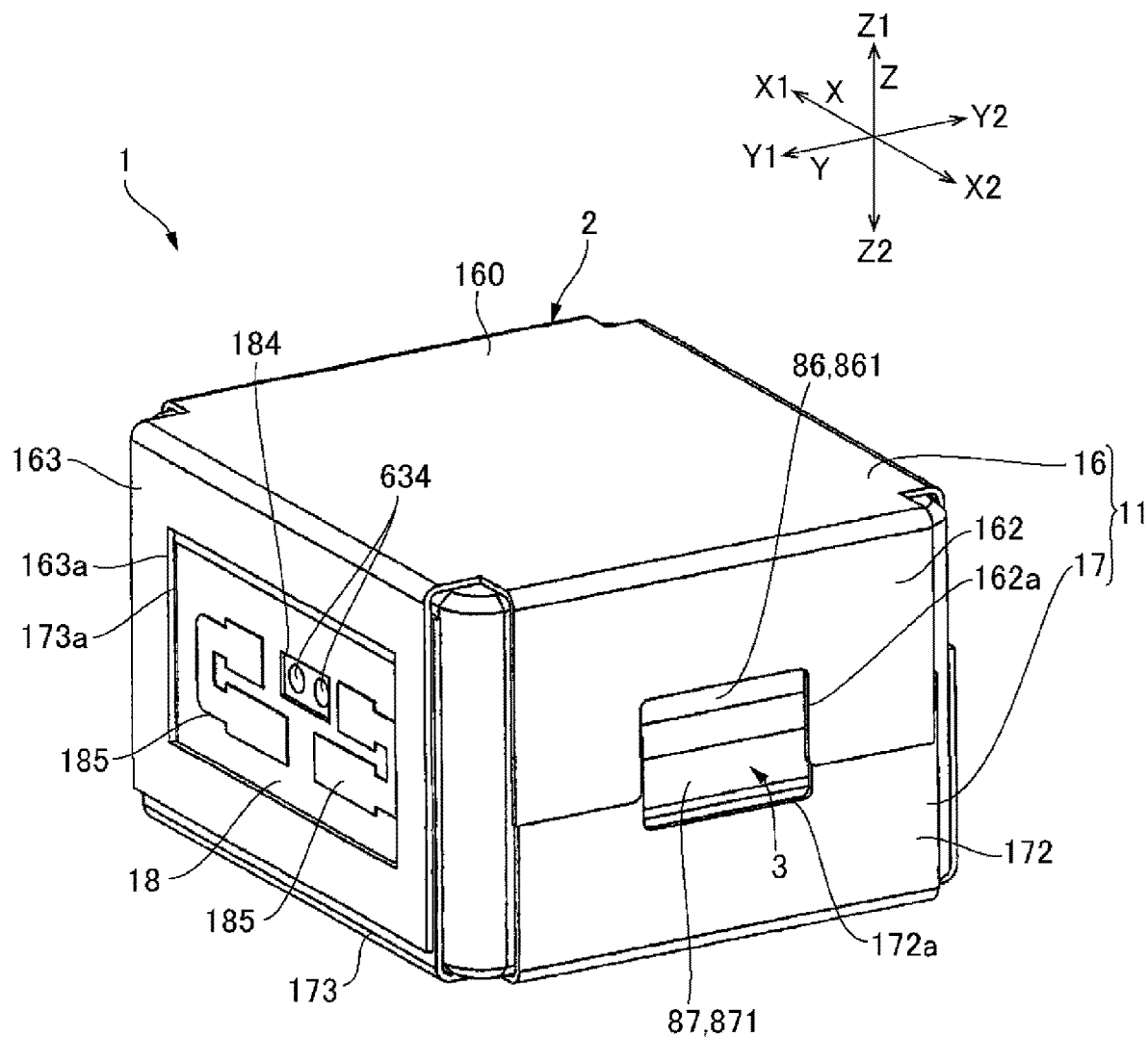
FIG. 1 is a perspective view of an actuator of an embodiment of the present invention.

An embodiment of the present invention is described hereinafter referring to the drawings. Note that, in the description, three directions crossing each other are the first direction Z, the second direction X and the third direction Y.

Also, the first direction Z, the second direction X and the third direction Y intersect each other perpendicularly. One side of the second direction X is given X1 and the other side of the second direction X is given X2; one side of the third direction Y is given Y1 and the other side of the third direction Y is given Y2; one side of the first direction Z is given Z1 and the other side of the first direction Z is given Z2.

The actuator 1 to which the present invention is applied has a magnetic drive circuit 6 which moves a movable body 3 relative to a support body 2; the magnetic drive circuit 6 includes a coil 7 and magnets 8. The magnetic drive circuit 6 may adopt a configuration in which the coil 7 is arranged to the support body 2 (one member) and the magnets 8 are arranged to the movable body 3 (the other member), or the magnets 8 are arranged to the support body 2 (one member) and the coil is arranged to the movable body 3 (the other member). In the description below, the coil 7 is arranged to the support body 2 and the magnets 8 are arranged to the movable body 3.

(Overall Configuration)

Figure 2:
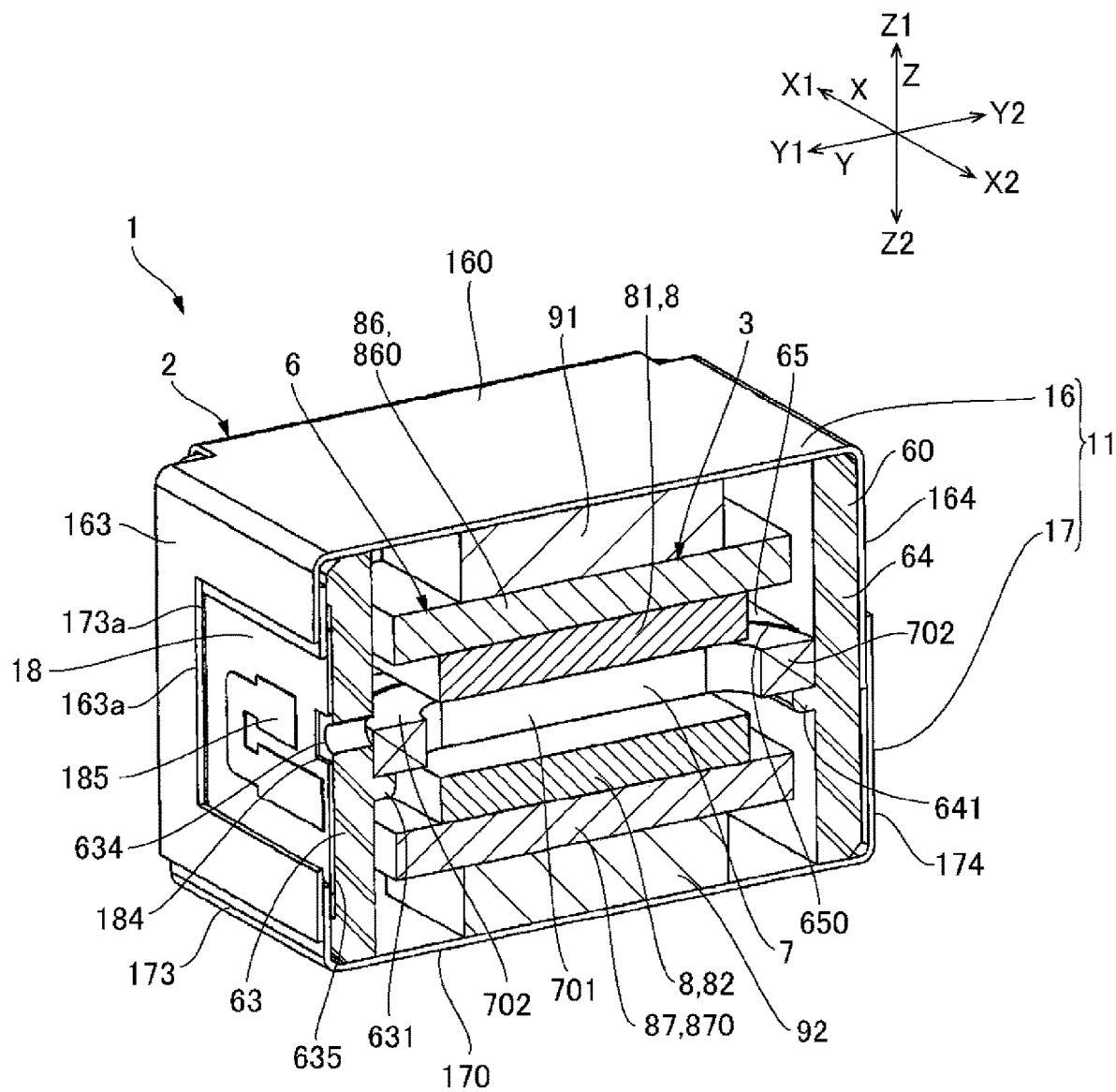
FIG. 2 is a cross-sectional view of the actuator of FIG. 1.
Figure 3:
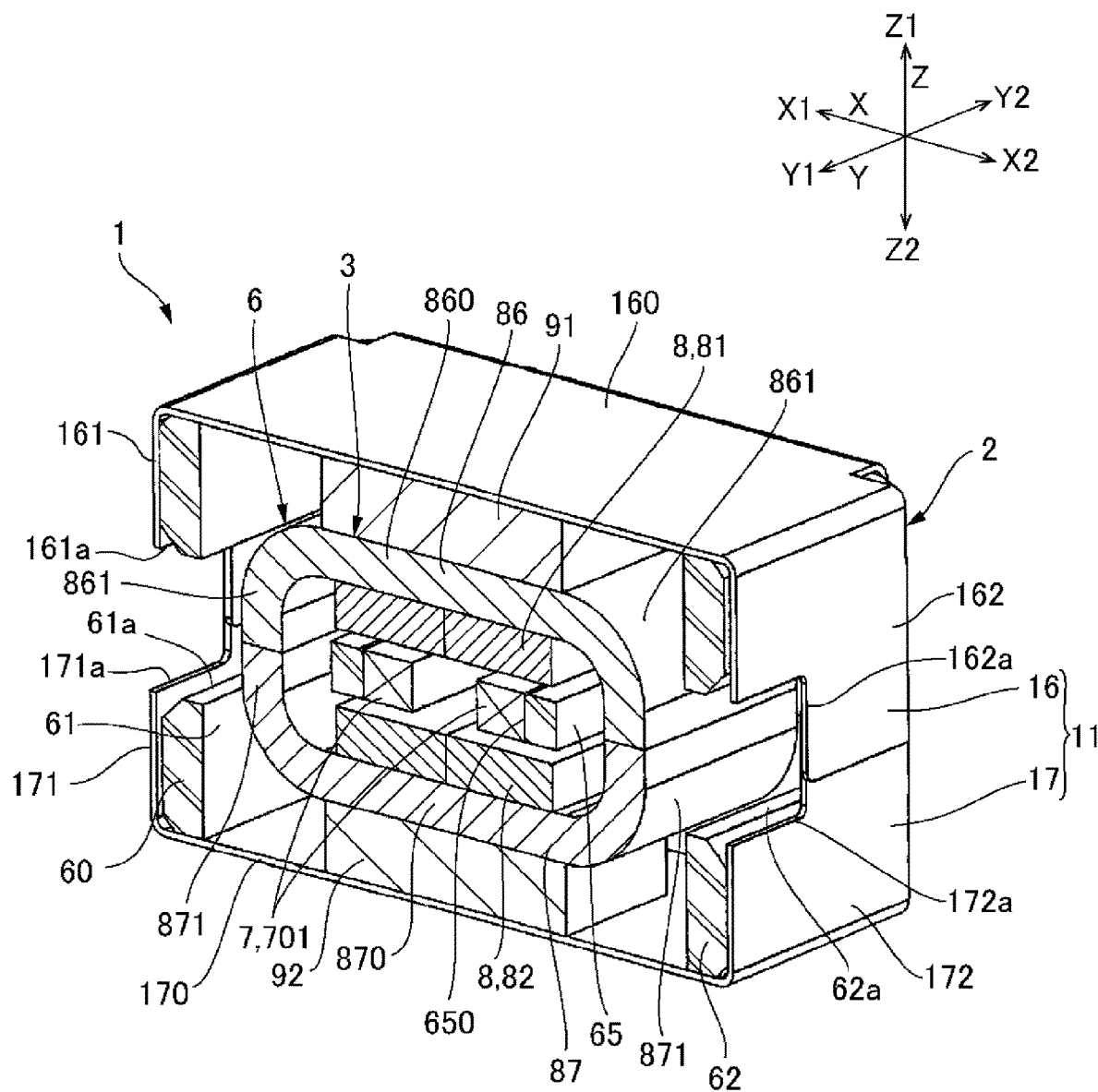
FIG. 3 is an XZ cross sectional view of the actuator of FIG. 1.

FIG. 1 is a perspective view of the actuator 1 of an embodiment of the present invention. FIG. 2 is an YZ cross-sectional view of the actuator 1 shown in FIG. 1. FIG. 3 is an XZ cross-sectional view of the actuator 1 shown in FIG. 1.

As shown in FIG. 1, FIG. 2 and FIG. 3, the support body 2 is in a rectangular parallelepiped as a whole and has the support body 2, the movable body 3 which is supported to be movable relative to the support body 2, and the magnetic drive circuit 6 which moves the movable body 3 relative to the support body 2; the magnetic drive circuit 6 vibrates the movable body 3 in the second direction X.

As shown in FIG. 1, FIG. 2 and FIG. 3, the support body 2 has a cover 11 and a holder 60; the movable body 3 and the magnetic drive circuit 6 shown in FIG. 2 and FIG. 3 are at least partially covered by the cover 11 from both sides in the first direction Z, both sides in the second direction X and both sides in the third direction Y. The cover 11 consists of a first cover member 16 positioned on one side Z1 in the first direction Z and a second cover member 17 meeting the first cover member 16 from the other side Z2 in the first direction Z; the first cover member 16 and the second cover member 17 are formed in a square planar shape. Between the first cover member 16 and the second cover member 17, the holder 60 in a square planar shape is positioned.

(Configuration of First Cover Member 16)

Figure 4:
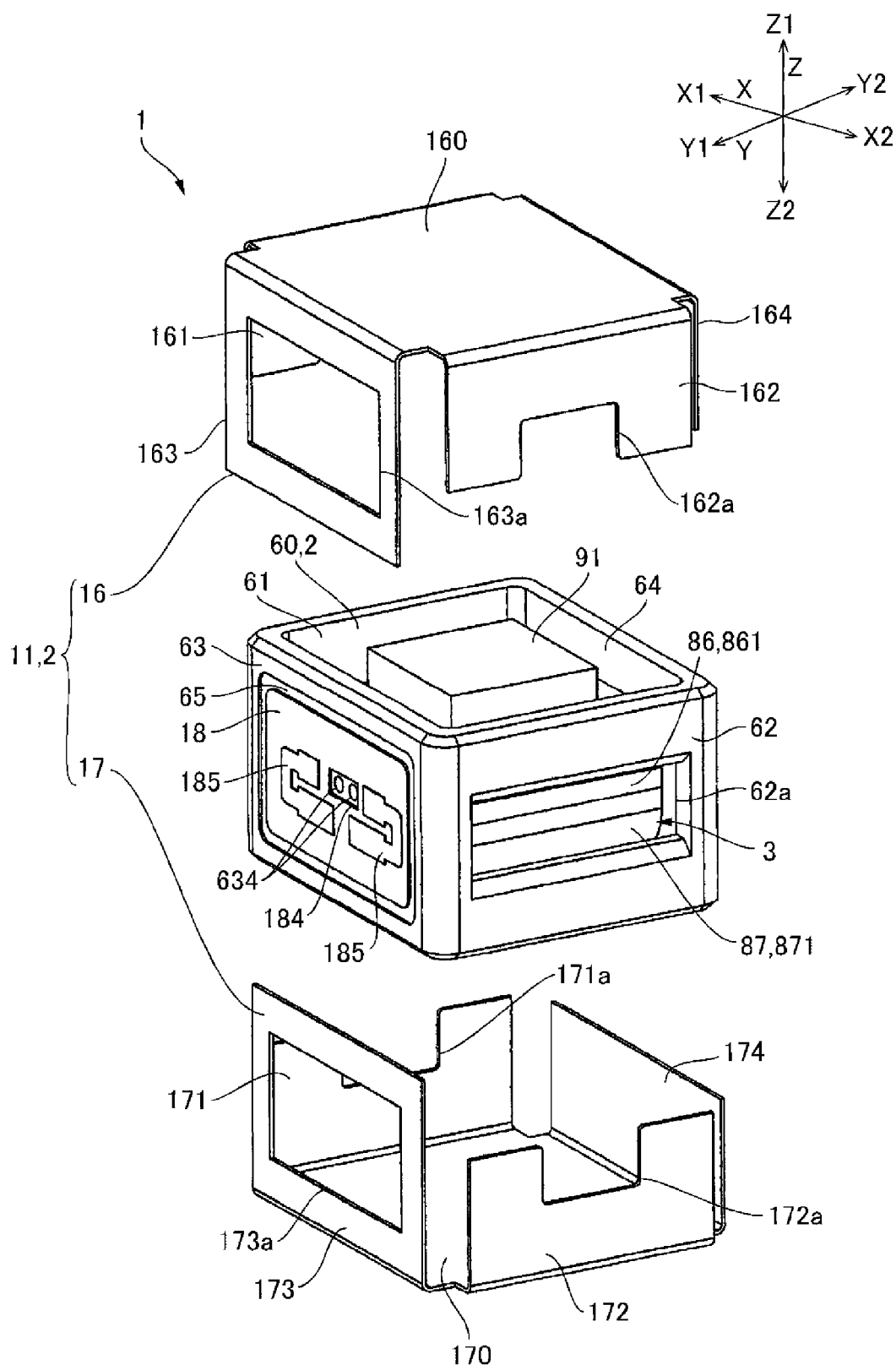
FIG. 4 is a perspective exploded view of the state of the actuator, having a shaft part of the output member removed from the actuator in FIG. 3.

FIG. 4 is a perspective exploded view of the actuator 1 shown in FIG. 1. As shown in FIG. 2, FIG. 3 and FIG. 4, the first cover member 16 is configured by a quadrangle, the first end plate part 160 and the side plate parts 161, 162, 163 and 164 which respectively extend from the edge of the sides of the first end plate part 160 toward the other side Z2 in the first direction Z. Among the side plate parts 161, 162, 163 and 164, the side plates parts 161 and 162 facing each other in the second direction X respectively have a rectangular notch 161a, 162a created therein. In the side plate part 163 positioned on one side Y1 in the third direction Y, an opening 163a larger than the notch 161a, 162a is created.

(Configuration of Second Cover Member 17)

The second cover member 17 consists of a square, the second end plate part 170 and the side plate parts 171, 172, 173 and 174 which extend from the edge of the sides of the second end plate part 170 toward one side Z1 in the first direction Z. Among the side plate parts 171, 172, 173 and 174, the side plate parts 171 and 172 facing each other in the second direction X respectively have a rectangular notch 171a, 172a created therein. In the side plate part 173 positioned on one side Y1 in the third direction Y, an opening 173a larger than the notch 171a, 172a is created; the opening 173a is aligned with the opening 163a created in the side plate part 163 in the first cover member 16.

(Configuration of Magnetic Drive Circuit)

As shown in FIG. 2 and FIG. 3, the magnetic drive circuit 6 has the coil 7 and the magnets 8 which face the coil 7 in the first direction Z. In this embodiment, the coil 7 is an elliptical air core coil having its longitudinal side 701 (the effective part) extending in the third direction Y. The coil 7 is held in the holder 60 and arranged to the support body 2. The magnets 8 are arranged to the movable body 3.

(Configuration of Holder 60)

Figure 5:
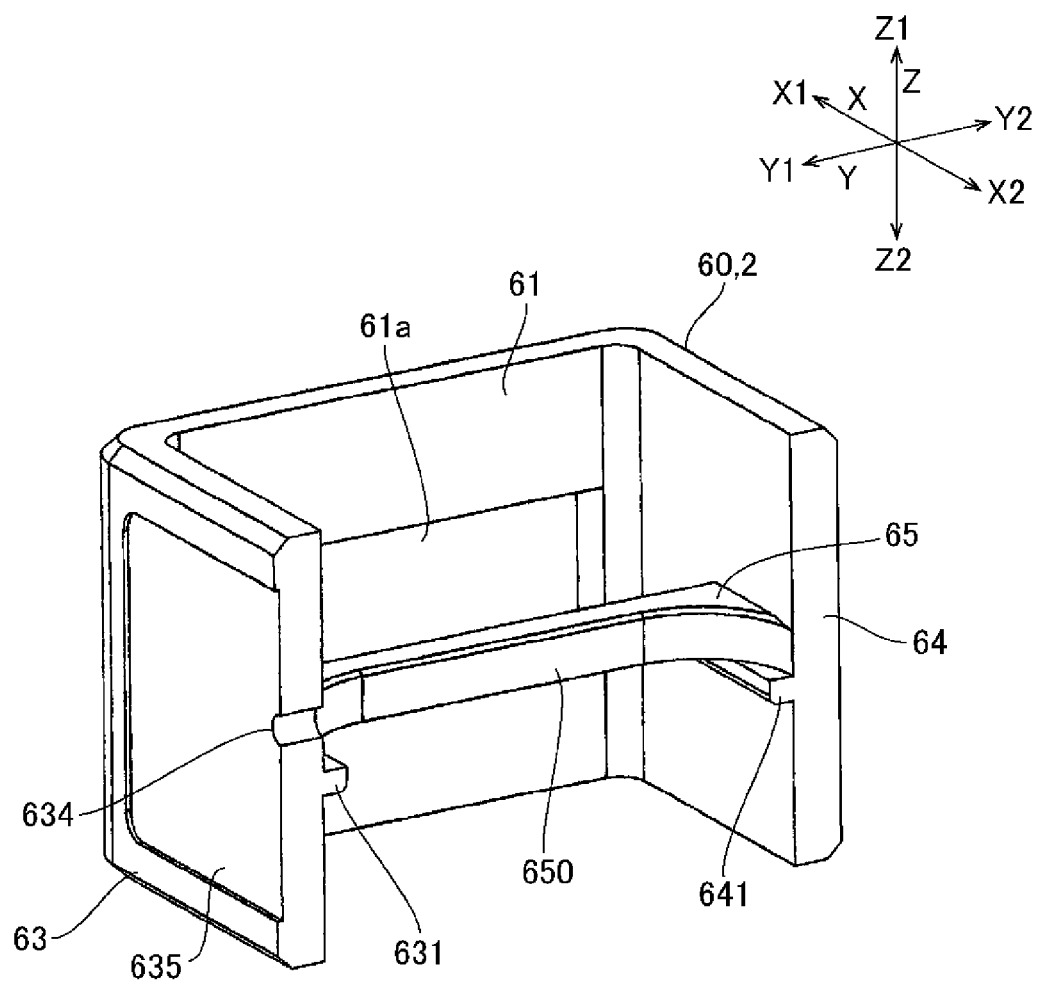
FIG. 5 is an YZ cross-sectional view of a holder shown in FIG. 2, etc.

FIG. 5 is a YZ cross-sectional view of the holder shown in FIG. 2, etc. As shown in FIG. 2, FIG. 3, FIG. 4 and FIG. 5, the holder 60 consists of side plate parts 61 and 62 facing each other in the second direction X and side plate parts 63 and 64 facing each other in the third direction Y; the side plate part 61, 62 has an opening 61a, 62a created therein.

As shown in FIG. 5, inside the holder 60, a plate part 65 is formed in the center position in the second direction X; both ends of the plate part 65 in the third direction Y are connected to the side plate parts 63 and 64. An elongated coil holding portion 650 having its axial direction in the third direction Y is formed in the plate part 65 and the coil 7 is positioned therein. The coil holding portion 650 is formed as a through hole. Note that, receiving portions 631 and 641 protruding from the side plate parts 63 and 64 on the other side Z2 in the first direction Z of the plate part 65 are formed at both ends of the coil holding portion 650 in the third direction Y. Therefore, when the coil 7 is mounted in the coil holding portion 650, the short sides 702 (the invalidity part) positioned at both ends of the coil 7 in the third direction Y are supported by the receiving portions 631 and 641. In this state, the coil 7 is fixed in the coil holding portion 650 by an adhesive, etc.

The middle portion of the side plate part 63 is made of a thinner plate, and a recess portion 635 is formed on the outside surface thereof. A wiring board 18 is fixed in the recess portion 635 by a method of adhesive. A rectangular hole 184 is created in the wiring board 18, and two holes 634 are created at positions in the side plate part 63, which fit in the hole 184. In the wiring board 18, two conductive patterns 185 with land are created. The wiring board 18 is exposed via the opening 163a created in the side plate part 163 of the first cover member 16 and the opening 173a created in the side plate part 173 of the second cover member 17. With the wiring board 18 configured in the above manner, the winding-start end and the winding-finish end of the coil 7 are pulled out through the holes 634 and the hole 184 and connected to the conductive patterns 185.

(Configuration of Movable Body 3)

Figure 6:
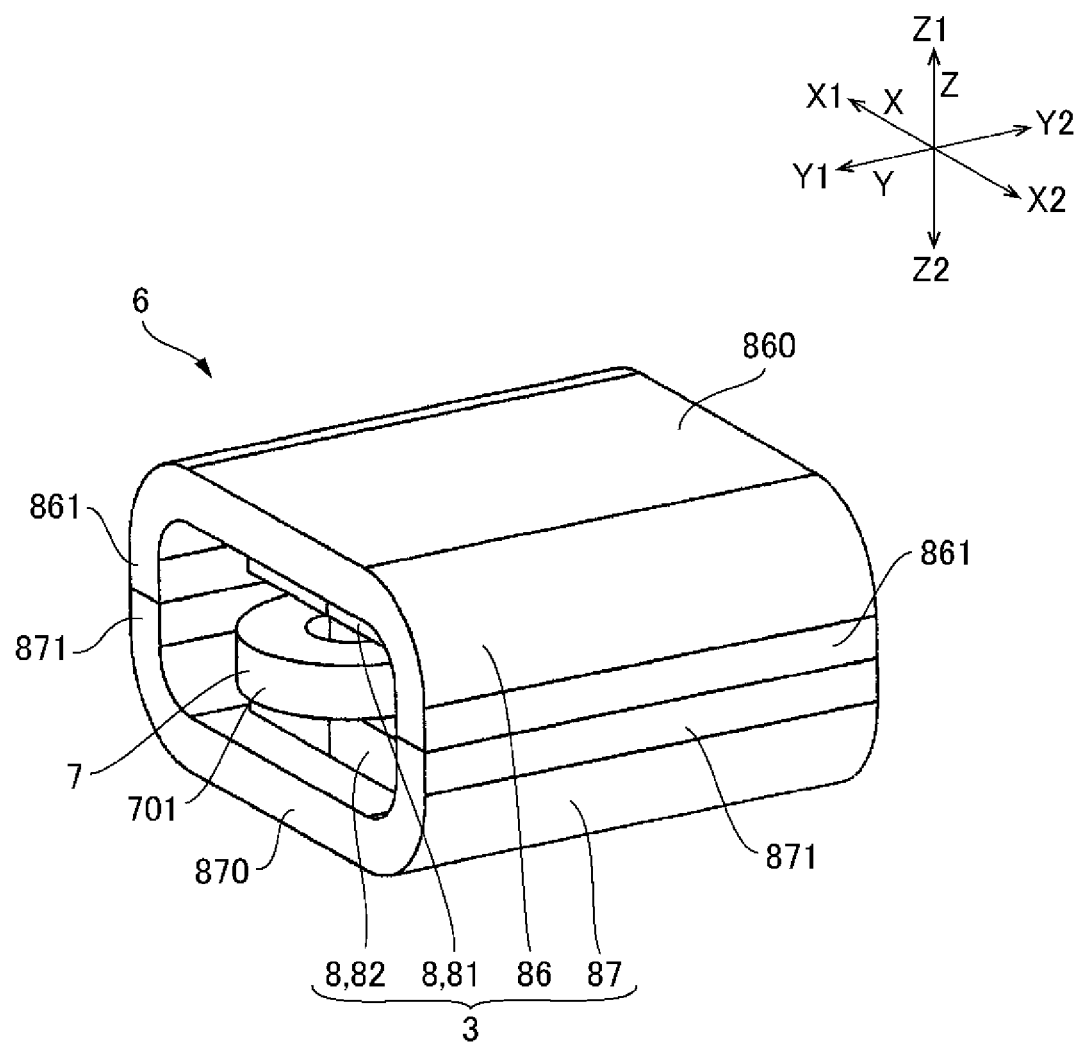
FIG. 6 is a perspective view of a magnetic drive circuit shown in FIG. 2, etc.
Figure 7:
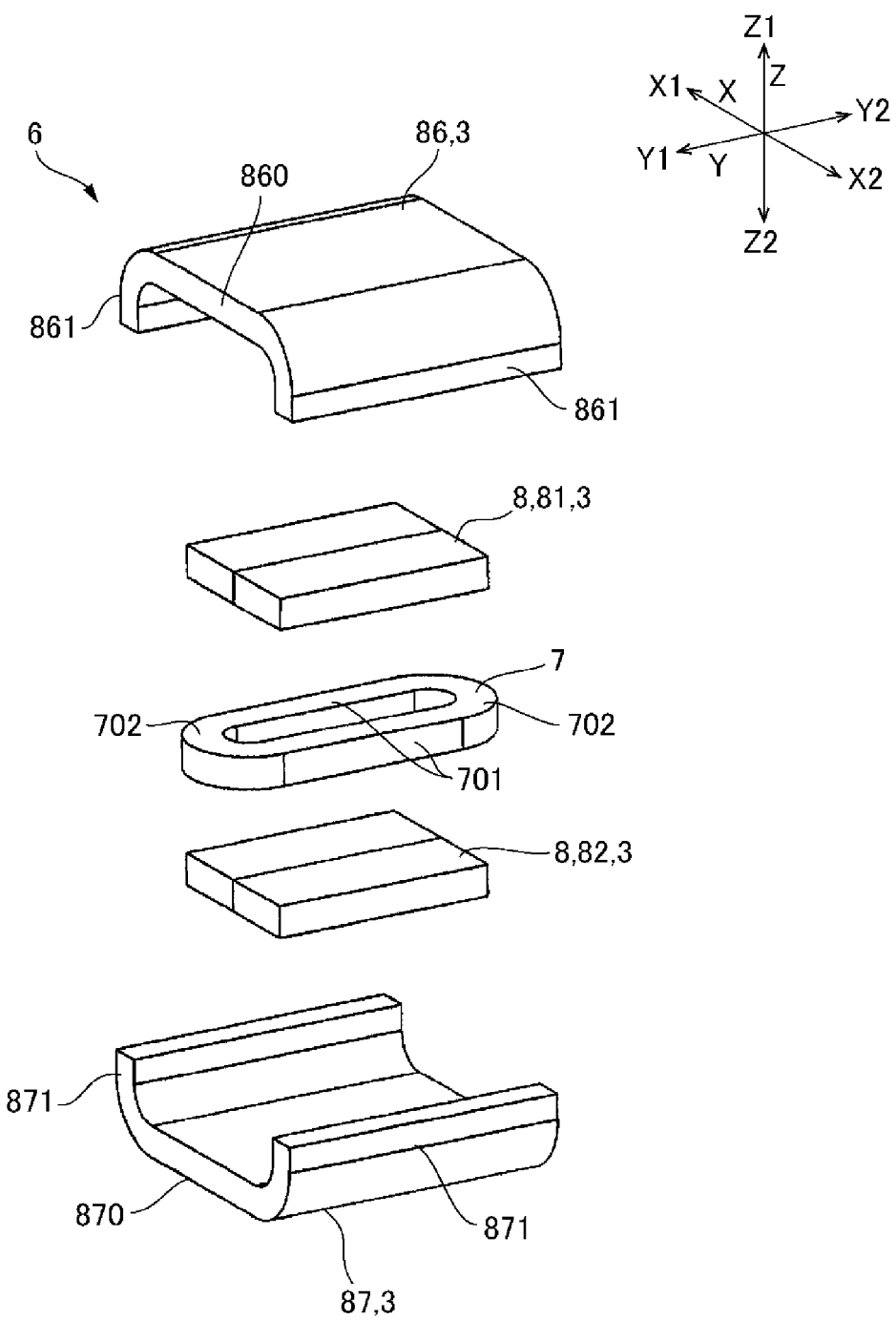
FIG. 7 is a perspective exploded view of the magnetic drive circuit shown in FIG. 6.

FIG. 6 is a perspective view of the magnetic drive circuit 6 shown in FIG. 2. In FIG. 2, FIG. 3, FIG. 6 and FIG. 7, the movable body 3 has a first yoke 86 having a first plate part 860 which faces the coil 7 from one side Z1 in the first direction Z and a second yoke 87 having a second plate part 870 which faces the coil 7 from the other side Z2 in the first direction Z. The magnets 8 are held to at least the surface of the first plate part 860 of the first yoke 86, which faces the coil 7, or the surface of the second plate part 870 of the second yoke 87, which faces the coil 7, and thus face the coil 7 from either side in the first direction Z.

In this embodiment, the first magnet 81 fixed to the surface of the first plate part 860 of the first yoke 86, which faces the coil 7, by a method of adhesive, etc. and the second magnet 82 fixed to the surface of the second plate part 870 of the second yoke 87, which faces the coil 7, by a method of adhesive, etc. are provided. In this state, the first magnet 81 faces the longitudinal sides 701 of the coil 7 from one side Z1 in the first direction Z; the second magnet 82 faces the longitudinal sides 701 of the coil 7 from the other side Z2 in the first direction Z. Each of the first magnet 81 and the second magnet 82 is polarized and magnetized in the second direction X, such that the surface of the first magnet 81 facing the coil 7 is magnetized with different polarity from the surface of the second magnet 82 facing the coil 7.

The first yoke 86 has two first joining plate parts 861 which extend from both ends of the first plate part 860 toward the other side Z2 in the first direction Z; the second yoke 87 has second joining plate parts 871 which extend from both ends to the second plate part 870 toward one side Z1 in the first direction Z and meet the first joining plate parts 861. The first joining plate parts 861 and the second joining plate parts 871 are joined together such that the end portions thereof are welded together.

(Configuration of Cover 11)

As shown in FIG. 2, FIG. 3 and FIG. 4, the first cover member 16 covers the holder 60 from one side Z1 in the first direction Z; the first end plate part 160 of the first cover member 16 is layered to contact the holder 60 from one side Z1 in the first direction Z. In this state, the first end plate part 160 of the first cover member 16 faces the first plate part 860 of the first yoke 86 of the movable body 3 in the first direction Z. Also, the second cover member 17 covers the holder 60 from the other side Z2 in the first direction Z; the second end plate part 170 of the second cover member 17 is layered to contact the holder 60 from the other side Z2 in the first direction Z. In this state, the second end plate part 170 of the second cover member 17 faces the second plate part 870 of the second yoke 87 of the movable body 3 in the first direction Z.

The first cover member 16 and the second cover member 17 are arranged such that the side plate parts 161 and 171 thereof are overlapped in the second direction X on one side X1 in the second direction X, and the side plate parts 162 and 172 thereof are overlapped in the second direction X on the other side X2 in the second direction X. Also, the first cover member 16 and the second cover member 17 are arranged such that the side plate parts 163 and 173 thereof are overlapped in the third direction Y on one side Y1 in the third direction Y, and the side plate parts 164 and 174 thereof are overlapped in the third direction Y on the other side Y2 in the third direction Y. Therefore, while the first cover member 16 and the second cover member 17 in the first direction Z are positioned in terms of the position of the holder 60, the side plate parts 161, 162, 163 and 164 are joined with the side plate parts 171, 172, 173 and 174 by welding, etc.

(Configuration of Viscoelastic Member)

As shown in FIG. 2, FIG. 3 and FIG. 4, between the movable body 3 and the support body 2, a first viscoelastic member 91 is arranged at a position at which the first plate part 860 of the first yoke 86 of the movable body 3 and the first end plate part 160 of the first cover member 16 face each other in the first direction Z. Between the movable body 3 and the support body 2, a second viscoelastic member 92 is arranged at a position at which the second plate part 870 of the second yoke 87 of the movable body 3 and the second end plate part 170 of the second cover member 17 face each other in the first direction Z. Thus, the movable body 3 is supported to the support body 2 via the first viscoelastic member 91 and the second viscoelastic member 92. The first viscoelastic member 91 is in the state of not being compressed or of being compressed moderately between the first plate part 860 of the first yoke 86 of the movable body 3 and the first end plate part 160 of the first cover member 16 and is in contact with the first plate part 860 of the first yoke 86 and the first end plate part 160 of the first cover member 16. In this embodiment, the first viscoelastic member 91 is bonded to the first plate part 860 of the first yoke 86 and to the first end plate part 160 of the first cover member 16. The second viscoelastic member 92 is in the state of not being compressed or of being compressed moderately between the second plate part 870 of the second yoke 87 of the movable body 3 and the second end plate part 170 of the second cover member 17 and is in contact with the second plate part 870 of the second yoke 87 and the second end plate part 170 of the second cover member 17. In this embodiment, the second viscoelastic member 92 is bonded to the second plate part 870 of the second yoke 87 and to the second end plate part 170 of the second cover members 17.

"Viscoelasticity" means the compounded characteristics of viscosity and elasticity, which are remarkably found in a polymer substance such as a gel-based, a plastic or a rubber member. Therefore, various kinds of gel-based members can be used for the first viscoelastic member 91 and the second viscoelastic member 92. Also, the first viscoelastic member 91 and the second viscoelastic member 92 may use various rubber materials and their modified materials such as natural rubber, diene-based rubber (such as styrene butadiene rubber, isoprene rubber or butadiene rubber, chloroprene rubber, acrylonitrile butadiene rubber, etc.) non-diene-based rubber (such as butyl rubber, ethylene propylene rubber, ethylene propylene diene rubber, urethane rubber, silicone rubber, fluororubber, etc.) or thermoplastic elastomer, etc. In this embodiment, the first viscoelastic member 91 and the second viscoelastic member 92 are each composed of a silicone-based gel with penetration of 10° to 110°. Penetration is defined by JIS-K-2227 or JIS-K-2220, where the smaller the value is, the harder the material is.

The first viscoelastic member 91 and the second viscoelastic member 92 each have linear or nonlinear stretch characteristics according to its stretching direction. For example, the first viscoelastic member 91 and the second viscoelastic member 92 demonstrate the stretch characteristics in which a nonlinear component (a spring coefficient) is larger than a linear component (a spring coefficient) when pressed and compressively deformed in its thickness direction (the axial direction). Also, when pulled and stretched in its thickness direction (in the axial direction), the first viscoelastic member 91 and the second viscoelastic member 92 demonstrate the stretch characteristics in which a linear component (a spring coefficient) is larger than a nonlinear component (a spring coefficient). On the other hand, when the first viscoelastic member 91 and the second viscoelastic member 92 are deformed in the direction (the shearing direction) crossing the thickness direction (the axial direction), they deform in the direction of pulling and stretching no matter which direction the movable body 3 moves; therefore, at the time, they demonstrate the stretch characteristics in which a linear component (a spring coefficient) is larger than a nonlinear component (a spring coefficient). Therefore, the first viscoelastic member 91 and the second viscoelastic member 92 demonstrate consistent spring force in any direction of motion. Therefore, reproducibility of vibratory acceleration corresponding to the input signals can be improved by utilizing the spring element of the first viscoelastic member 91 and the second viscoelastic member 92 in the shearing direction, enabling it to produce vibrations with delicate nuances.

(Basic Operation)

In the actuator 1 of this embodiment, when an alternating current is applied to the coil 7, the movable body 3 is vibrated in the second direction X; therefore, the center of gravity in the actuator 1 shifts in the second direction X. For this reason, a user can feel vibrations in the second direction X. At that time, if the alternating current waveform applied to the coil 7 is adjusted to differentiate the acceleration at which the movable body 3 moves to one side X1 in the second direction X from the acceleration at which the movable body 3 moves to the other side X2 in the second direction X, a user can feel vibrations having directionality in the second direction X.

(Major Effects of This Embodiment)

As described above, in the actuator 1 of this embodiment, the first end plate part 160 of the first cover member 16 of the support body 2 is layered on one side Z1 in the first direction Z of the holder 60 and faces the movable body 3 from one side Z1 in the first direction Z. Thus, the first end plate part 160 is positioned on the basis of the position of the holder 60; therefore, the amount of the space between the movable body 3 and the first end plate part 160 in the first direction Z is prevented from easily varying. Thus, the first viscoelastic members 91 interposed at the positions at which the movable body 3 and the first end plate part 160 face each other in the first direction Z make proper contacts with the movable body 3 and the first end plate part 160 and will not be excessively collapsed, thus facilitating to properly position the first viscoelastic members 91 between the support body 2 and the movable body 3. Also, the second end plate part 170 of the second cover member 17 of the support body 2 overlaps the holder 60 from the other side Z2 in the first direction Z and faces the movable body 3 on the other side Z2 in the first direction Z. Thus, the second end plate part 170 is positioned on the basis of the position of the holder 60; therefore, the amount of the space between the movable body 3 and the second end plate part 170 in the first direction Z is prevented from easily varying. Thus, the second viscoelastic member 92 interposed at the position at which the movable body 3 and the second end plate part 170 face each other in the first direction Z make proper contacts with the movable body 3 and the second end plate part 170 and will not be excessively collapsed; thus, the second viscoelastic member 92 can properly be arranged between the support body 2 and the movable body 3. According to this embodiment, therefore, resonance caused when the movable body 3 is driven can properly be restrained.

The magnetic drive circuit 6 has the first magnet 81 on one side Z1 in the first direction Z of the coil 7, fixed to the first yoke 86, and the second magnet 82 on the other side Z2 in the first direction Z of the coil 7, fixed to the second yoke 87. Therefore, thrust to the movable body 3 can be increased. Also, since the movable body 3 is configured to be symmetrical or essentially symmetrical in the first direction Z, the center of drive of the magnetic drive circuit 6 and the center of gravity of the movable body 3 agree or essentially agree with each other in the first direction Z. Therefore, when driven, the movable body 3 will not tilt easily.

The first cover member 16 and the second cover member 17 have the side plate parts 161, 162, 171 and 172, each pair of which are overlapped in the second direction X. Also, the first cover member 16 and the second cover member 17 have the side plate parts 163, 164, 173 and 174, each pair of which are overlapped in the third direction Y. Therefore, even when the first cover member 16 and the second cove remember 17 are positioned in the first direction Z on the basis of the position of the holder 60, the side plate parts 161, 162 and the side plate parts 171, 172 respectively overlap each other in the second direction X with certainty. Also, even when the first cover member 16 and the second cover member 17 are positioned in the first direction Z on the basis of the position of the holder 60, the side plate parts 163, 164 and the side plate parts 173, 174 respectively overlap each other in the third direction Y with certainty.

Other Embodiments

In the above embodiment, two magnets (the first magnet 81 and the second magnet 82) are provided; however, the present invention may be applied to a configuration in which the magnet 8 is positioned only on one side Z1 in the first direction Z of the coil 7 and only the second yoke 87 is provided on the other side Z2 in the first direction Z of the coil 7.

In the above embodiment, a gel-based damper member is used for the viscoelastic member; however, a rubber-based member, etc. may be used for the viscoelastic member.

In the above embodiment, the coil 7 is arranged to the support body 2 and the magnet 8 is arranged to the movable body 3; however, the present invention may be applied to a configuration in which the coil 7 is arranged to the movable body 3 while the magnet 8 is arranged to the support body 2. In the above embodiment, the present invention is applied to the actuator which drives the movable body 3 only in the second direction X; however, the present invention may be applied to an actuator in which the movable body 3 is driven both in the second direction X and the third direction Y.

What is claimed is:

1. An actuator comprising:
    a support body;
    a movable body; and
    a magnetic drive circuit, having a coil and magnets which face the coil in a first direction for driving the movable body in a second direction crossing the first direction;
    wherein
    the support body includes:
        a holder which holds the coil;
        a first end plate part which is layered on one side in the first direction of the holder and faces the movable body from one side in the first direction; and
        a second end plate part which is layered on the other side in the first direction of the holder and faces the movable body from the other side in the first direction;
    wherein the first end plate part and the second end plate part are positioned in the first direction on the basis of the position of the holder;
    wherein the holder includes:
        a side plate part extending in the first direction between the first end plate part and the second end plate part; and
        a receiving portion protruding from the side plate part toward an inside of the holder;
    wherein the coil is supported by the receiving portion;
    wherein the movable body is provided with a first yoke which has a first magnet as part of the magnets fixed at a portion thereof facing one side in the first direction of the coil and a second yoke which faces the other side in the first direction of the coil;
    between the movable body and the support body, a first viscoelastic member is interposed in a position at which the first yoke and the first end plate part face in the first direction, and a second viscoelastic member is interposed in a position at which the second yoke and the second end plate part face in the first direction.

2. The actuator as set forth in claim 1, wherein
    a second magnet as part of the magnets is fixed to a portion of the second yoke, which faces the other side in the first direction of the coil.

3. The actuator as set forth in claim 1, further comprising:
    a first cover member, provided with the first end plate part; and
    a second cover member, provided with the second end plate part;
    wherein the holder and the movable body are at least partially covered by the first cover member and the second cover member in the first direction and the second direction.

4. The actuator as set forth in claim 3, wherein
    at least the first cover member or the second cover member has side plate parts which overlap the other of either of the first cover member or the second cover member in the second direction.

5. The actuator as set forth in claim 2, further comprising:
    a first cover member, provided with the first end plate part; and
    a second cover member, provided with the second end plate part;
    wherein the holder and the movable body are at least partially covered by the first cover member and the second cover member in the first direction and the second direction.

6. The actuator as set forth in claim 5, wherein
    at least the first cover member or the second cover member has side plate parts which overlap the other of either of the first cover member or the second cover member in the second direction.

* * * * *